United States Patent [19]

Salle

[11] Patent Number: 5,530,869
[45] Date of Patent: Jun. 25, 1996

[54] SYSTEM AND METHOD FOR LOCATING AND IMPLEMENTING COMMANDS WITHOUT INVOKING A MENU HIERARCHY

[76] Inventor: Donald A. Salle, 3313 Shasta Dr., San Mateo, Calif. 94403-3708

[21] Appl. No.: 348,362

[22] Filed: Nov. 30, 1994

[51] Int. Cl.⁶ .............................. G06F 15/40; G06F 3/00
[52] U.S. Cl. ...................... 395/700; 395/155; 395/156; 395/160; 395/922; 364/DIG. 1; 364/DIG. 2; 364/948.21; 364/948.22
[58] Field of Search .................................. 395/700, 800, 395/156; 364/521

[56] References Cited

U.S. PATENT DOCUMENTS 4,821,211  4/1989  Torres ...................................... 364/521
5,119,475  6/1992  Smith et al. .............................. 395/156
5,220,675  6/1993  Padawer et al. ......................... 395/800
5,287,514  2/1994  Gram ....................................... 395/700

*Primary Examiner*—Kevin A. Kriess
*Assistant Examiner*—Majid A. Banankhah
*Attorney, Agent, or Firm*—John T. McNelis

[57] ABSTRACT

A system and method efficiently locates program features in a menu-oriented software program. The system and method enable a user to locate a feature in a menu-based program by flattening the hierarchy without requiring prior knowledge of the terms used in the menu-oriented program or the menu structure. Additionally, the system and method permit the user to customize the system by inputting user-defined terms and features and associating the terms with a particular feature.

27 Claims, 20 Drawing Sheets

SYSTEM AND METHOD FOR LOCATING AND IMPLEMENTING COMMANDS WITHOUT INVOKING A MENU HIERARCHY

FIELD OF THE INVENTION

The invention relates generally to the field of computer programs, particularly to a technique for locating menu commands in a menu-based computer program.

BACKGROUND OF THE INVENTION

When working with a menu-based application software program, users frequently find it difficult to locate a particular feature command within the hierarchical labyrinth of menus. It is not uncommon to have a feature command located two or more menu layers below a main menu. A user who is unfamiliar with a particular application (host) program or who works with several different host programs may have a difficult time locating the menu from which a desired feature command can be implemented. It has been estimated that when accessing a menu in a host program, users spend approximately seventy percent of their time searching menus in an attempt to find the proper feature command. Even users who frequently use a particular program may encounter difficulty finding the menu branch that contains a desired feature, particularly if that feature is infrequently used.

Another problem confronting users when working in a menu-based software environment is that in order to perform a function, the user must be familiar with the terminology, i.e., the jargon, used by the software developer. The jargon for different programs may not be consistent. For example, when attempting to locate a combination of characters in a text document a user implements the "find" command when using Microsoft Word for Windows (developed by the Microsoft Corporation, Seattle, Wash., hereafter Microsoft Word), but must implement a "search" command when using WordPerfect (developed by the WordPerfect Corporation, Orem, Utah).

Inconsistent terminology for similar features is not the only difficulty a user may encounter when using a menu-based program. Individual users can disagree as to the term that best describes a feature. A user who wants the program to perform a feature, e.g., to locate a combination of characters in a document, may have trouble determining how to perform the feature when using a specific host program. Using the program's "Help" menu of a program may not assist the user if the term that "best" describes an individual feature, e.g., "locate" or "locate character combination", is not in the help database. In addition, current applications do not permit the user to include terms that describe the feature more precisely by customizing the "Help" menu. Another problem is that a user cannot customize the "Help" menu to describe easier techniques for implementing a feature, for example, using a user-defined toolbar icon or a user-defined macro. Currently, it is difficult to determine if another user of the host program has developed an easier technique for implementing a feature.

There have been several attempts at solving some of the above problems. In the Excel program (commercially available from Microsoft Corporation) a portion of a help menu permits a user to perform a feature available in a competitor's program, i.e., Lotus 1-2-3 (developed by Lotus Development Corporation, Cambridge, Mass.). When using the help menu, an Excel user can proceed through a list of the menu names in Lotus 1-2-3 to find the name of the desired Lotus 1-2-3 feature. Microsoft Excel can demonstrate how to perform the Lotus 1-2-3 feature using Microsoft Excel. The above technique has many problems. First, the user must be fully acquainted with the terminology of Lotus 1-2-3 in order to use this Help menu feature. Second, the terms describing the feature are not customizable by the user, therefore the user is still restricted by the terminology used in Lotus 1-2-3. Third, the Microsoft Access "Help" feature does not flatten (level) the menu hierarchy. The Lotus 1-2-3 feature remains in the same hierarchy.

Another attempt at solving some of the above problems is an alphabetical help feature. Microsoft Word has such a help feature. When chosen, the alphabetical help feature displays a list of terms describing the available features in the program. This technique has several problems. First, the help feature requires a knowledge of the jargon used in the program. For example, the terms "locate" and "endnote" are not found in the Microsoft Word help list. Second, the alphabetically displayed list is not customizable by the user. Third, the display is static, that is the user is not given the option of having the feature performed while in the help menu.

What is needed is a system and method that: (1) flattens the menu hierarchy to enable a user to easily locate a feature in a menu-based program; (2) does not require prior knowledge of the terms used in the menu-based program; (3) permits the user to customize the system by inputting user-defined terms and associating the terms with a particular feature; and (4) permits the user to implement the feature immediately, without requiring the user to backtrack or exit any menus.

SUMMARY OF THE INVENTION

The system and method of the present invention efficiently locates program features in a menu-oriented software program. The system and method enable a user to locate a feature in a menu-based program by flattening the hierarchy without requiring prior knowledge of the terms used in the menu-oriented program. Additionally, the system and method permit the user to customize the system by inputting user-defined terms and associating the terms with a particular feature, thus permitting the user to access the feature using their own terminology. The capabilities of this invention can be easily added to most application programs through an installation process that adds a Feature Finder menu item to the Help menu of the host program. The capabilities of Feature Finder can also be programmed as a part of the computer code of the host program.

DETAILED DESCRIPTION OF THE PREFERRED EMBODIMENTS

A preferred embodiment of the present invention is now described with reference to the figures where like reference numbers indicate identical or functionally similar elements. Also in the figures, the left-most digits of each reference number correspond to the figure in which the reference number is first used.

Figure 1:
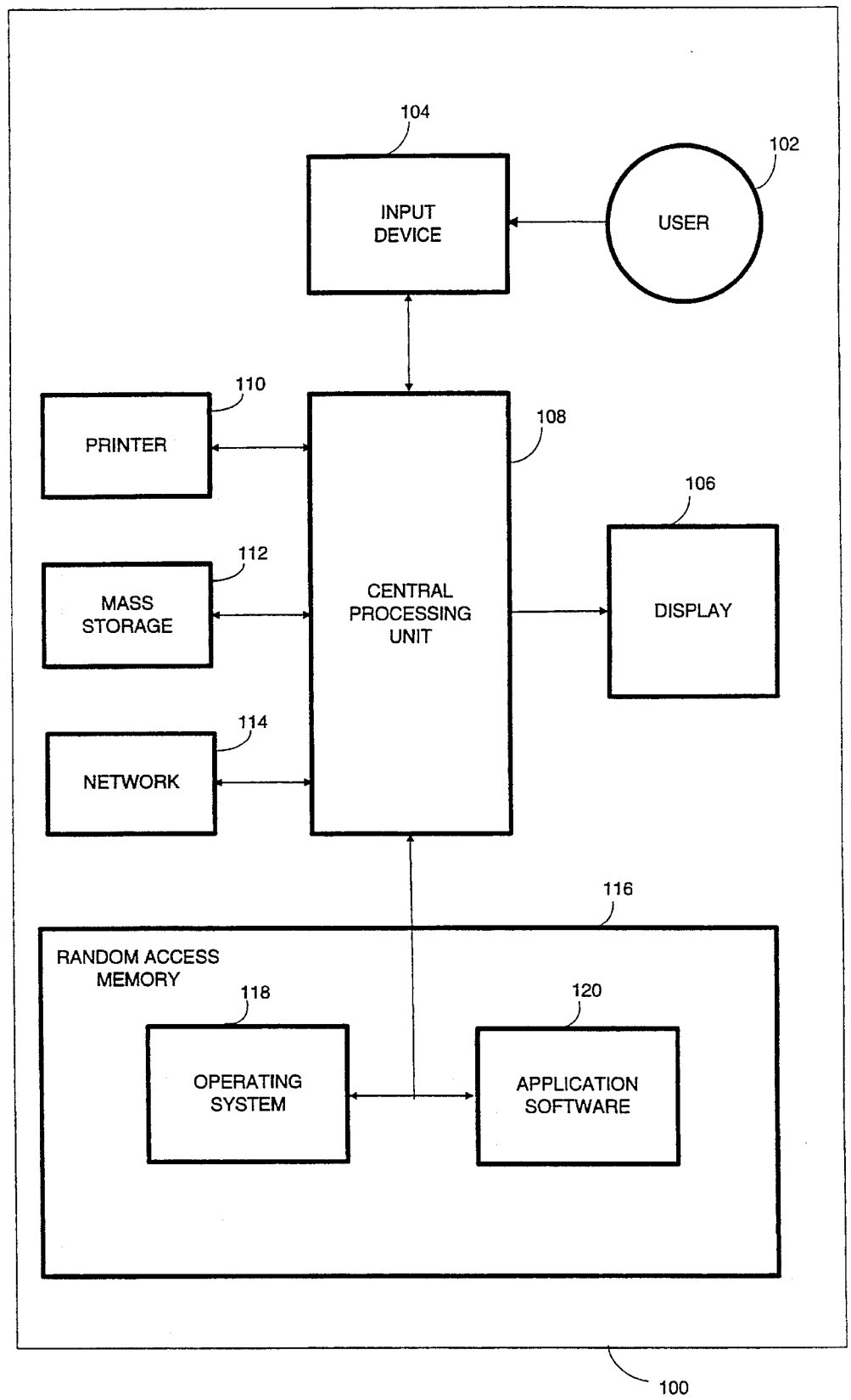
FIG. 1 is an illustration of a computer system in which the preferred embodiment of the present invention resides.

FIG. 1 illustrates a computer system in which one embodiment of the present invention resides. The computer system 100 includes an input device 104 coupled to a central processing unit (CPU) 108, the CPU 108 is also coupled to a display monitor 106, a printer 110, a mass storage device 112 and random access memory (RAM) 116. During computer operation the RAM 116 includes an operating system 118 and a host program 120. The input device 104, CPU 108, display 106, printer 110, and mass storage 112 are all part of a conventional computing system, e.g., an International Business Machines (IBM) personal computer (made by IBM Corporation) or, for example, a Macintosh computer (mde by Apple Computer, Cupertino, Calif.) or a Sun Microsystem computer. In some embodiments the computer system is coupled to a network 114. The RAM 11.6 includes an operating system 118 and also includes host program 120 that is described in greater detail below.

Figure 2:
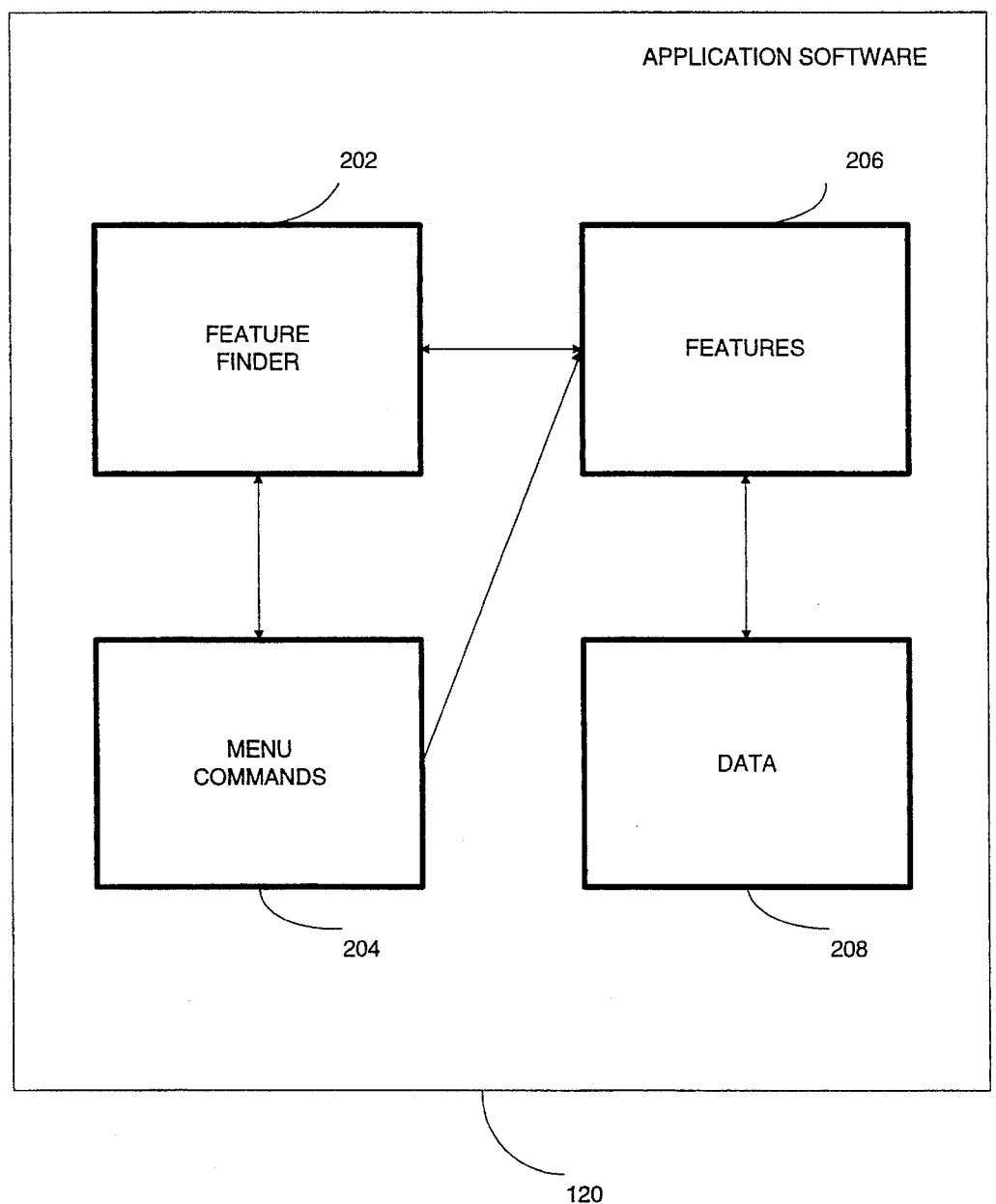
FIG. 2 is an illustration of an application software program in which the preferred embodiment resides.

FIG. 2 is a more detailed illustration of the host program 120. The host program 120 has several software modules including a Feature Finder module 202, a menu commands module 204, a functions module 206, and a data module 208. The Feature Finder module 202 is described in detail below. When implemented by the CPU 108 the menu commands module 204 generates the menu hierarchy on the display 106. In addition, the menu commands module 204 communicates with the features module 206 and identifies the function to be performed. The features module 206, in conjunction with the CPU 108, performs the feature requested by the user 102. The data module 208 contains the data necessary to facilitate the proper operation of the host program 120.

Figure 3:
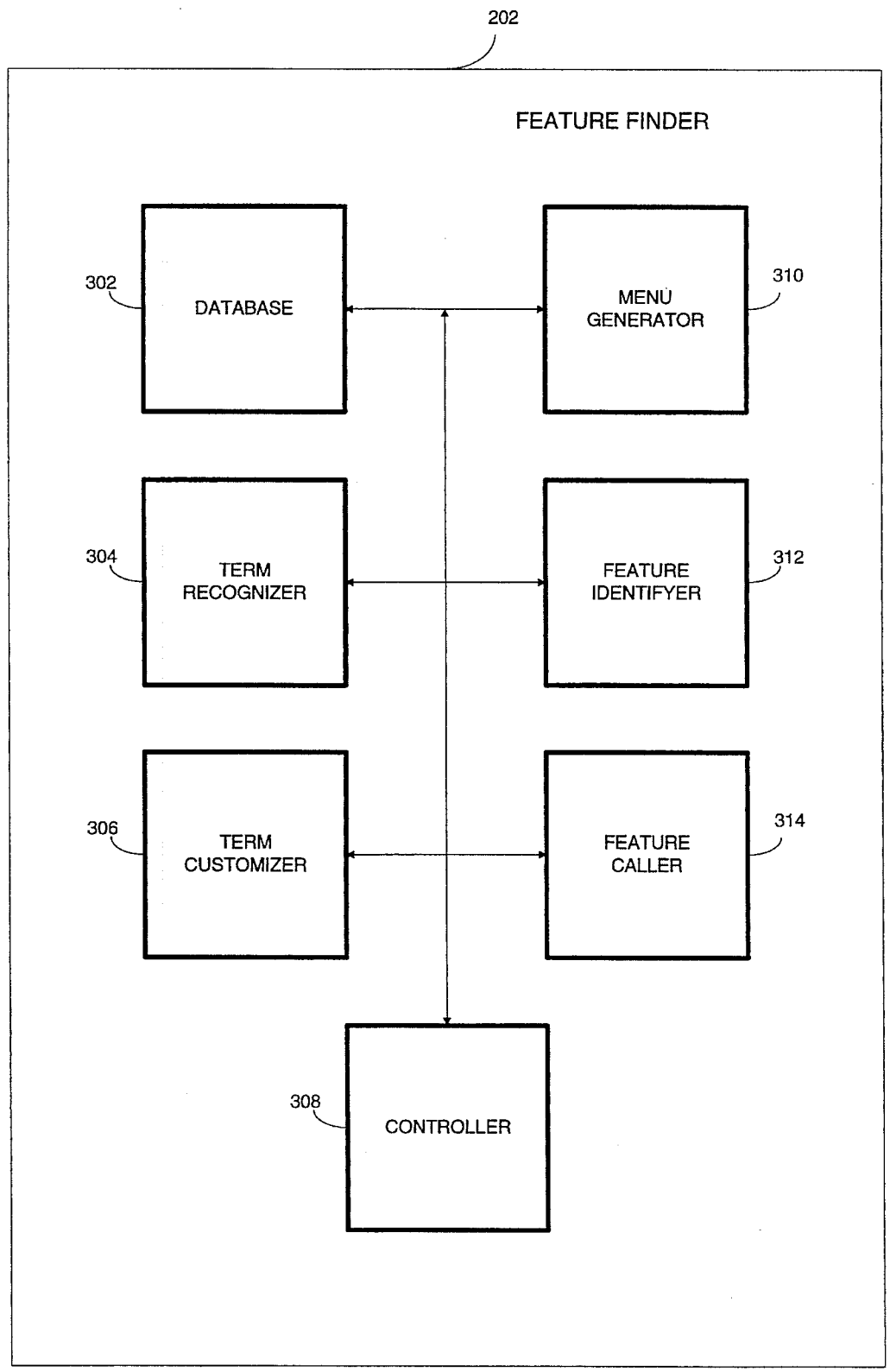
FIG. 3 is an illustration of the preferred embodiment.

FIG. 3 represents a more detailed illustration of the Feature Finder module 202. The Feature Finder module includes several software components such as a database 302, a term recognizer 304, a term customizer 306, a controller 308, a menu generator 310, a feature identifier 312, and a feature caller 314. The database 302 contains a multitude of terms, term descriptions, hot keys, and commands to locate and access the host program's features, as described below. The term recognizer 304 matches an input term with a key term associated with a program feature. The term customizer 306 enables the user to customize the key terms associated with any program feature of the host program or any additional features, e.g., features from add-in programs. The controller 308 controls various administrative features of the Feature Finder module 202. The menu generator 310 adds the Feature Finder to the host program 120. The feature identifier 312 determines the feature associated with the key term. The feature caller 314 helps implement the chosen feature. The features performed by each component 302–314 of the Feature Finder module 202 are described in greater detail below with reference to FIGS. 4–5.

Figure 4A:
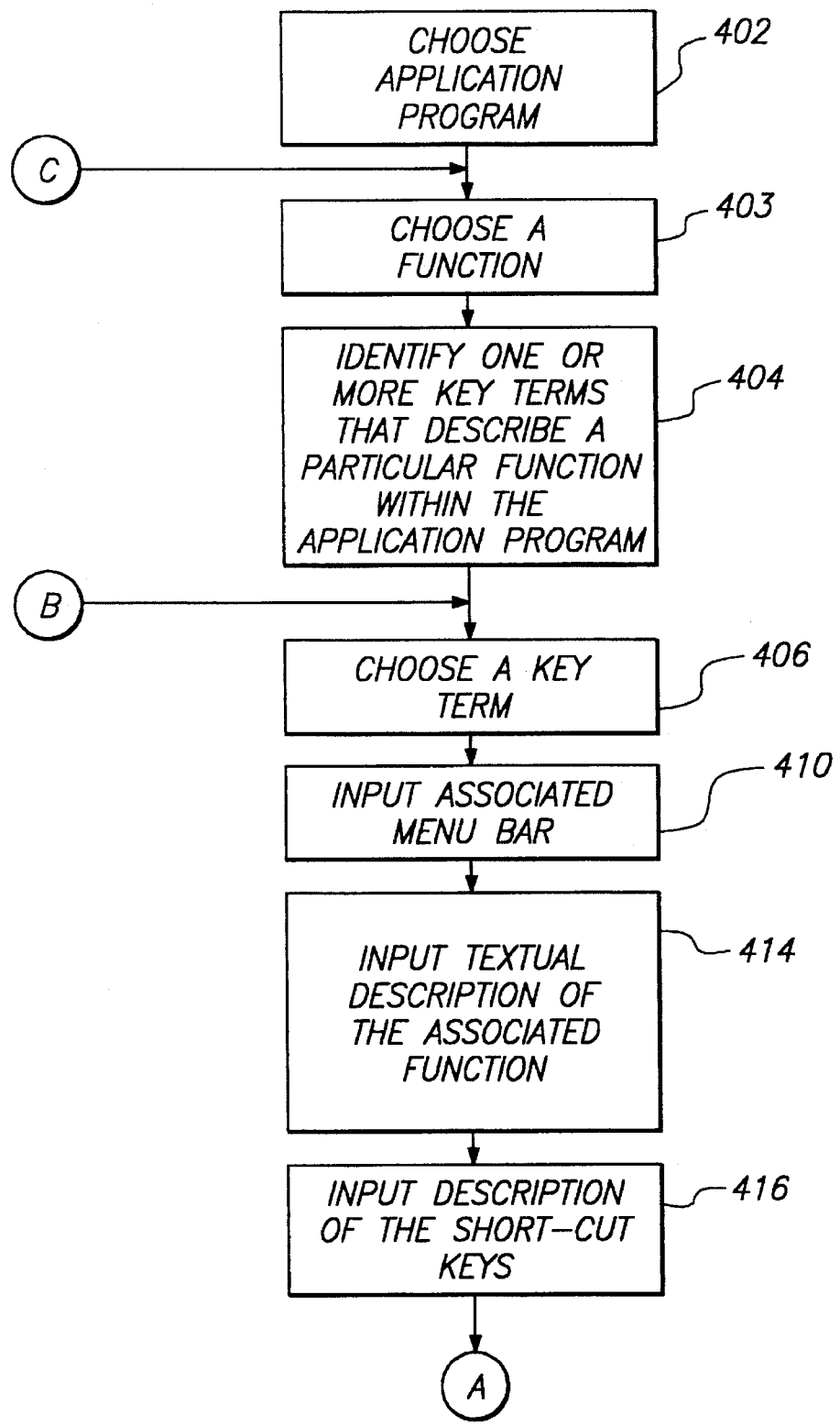
FIGS. 4A and 4B illustrate a flow diagram describing the method for creating a database for the preferred embodiment.
Figure 4B:
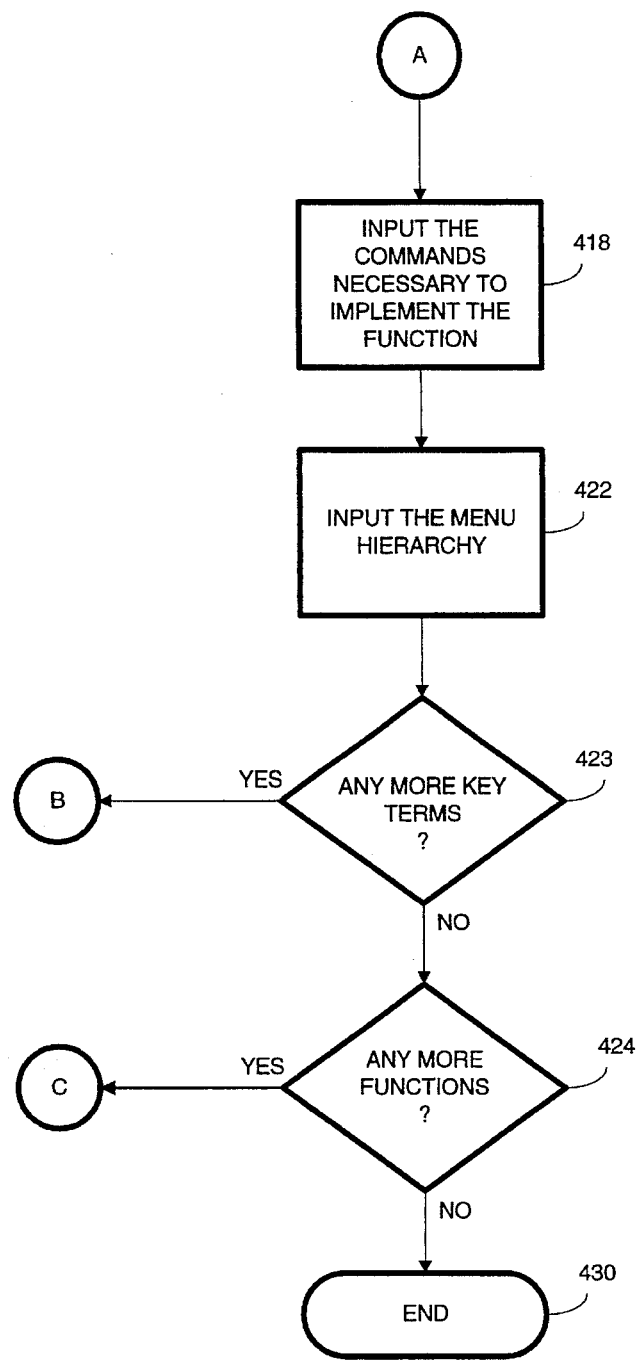

FIG. 4A and 4B illustrate a flow chart showing a technique for creating a Feature Finder database 302 for a host program 120. After choosing 402 the host program 120 to which the Feature Finder module 202 is to be added, a feature of the host program 120 is chosen 403. One or more key terms are identified 404 that describe the chosen feature. One of these key terms is chosen 406 and the Feature Finder module 202 receives information pertaining to the key term and its associated feature. The Feature Finder receives 410 a menu bar associated with the chosen key term, a textual description 414 of the associated feature, a description 416 of the short-cut keys that implement the command (these can be the short-cut keys designed in the host program 120 or a user-defined macro, for examaple), the commands 418 necessary to have the host program 120 implement the feature, and the location 422 of the menu where the feature can be accessed. Other information can also be input and stored in the database 302. For example, the limits of feature availability, e.g., an indication of the particular state or context that the host program 120 must be in order to access the chosen feature, as described below. Steps 406–422 are repeated 423 for each key term associated with a particular feature. Steps 403–423 are repeated 424 for each feature of the host program 120.

After creating the database 302, the Feature Finder module 202 can be added to the host program 120. The user can install the Feature Finder to be accessible from an application program menu, thus, "Feature Finder" can be one menu item in the "Help" menu of the host program 120. Adding the Feature Finder feature to a pre-existing menu can be accomplished by employing an installation program that locates the path to the host application, then the installation program makes a Windows Application Programming Interface (API) call to the menu system of the host program. The API call then locates the Help menu of the host program and adds a Feature Finder menu item as the last item in that Help Menu. Similar programming interfaces are used on the Macintosh operating systems and the Sun Microsystems workstation operating systems. Programs thus added to a host application are referred to as "Add-ins". An example of an Add-in is Doc-To-Help, by WexTech Systems Inc., New York, N.Y., which is a program that attaches to Microsoft Word and adds numerous menu items to various Word menus. In this fashion, the Add-in program extends the features and capabilities of the host application. Similarly, Feature Finder can be attached to most programs, thereby extending the capabilities of the host application to be more easily used by expert and novice users alike; users will not be dependent on their knowledge of the host application's jargon or menu structure and can easily gain access to the features of the host application.

Figure 5A:
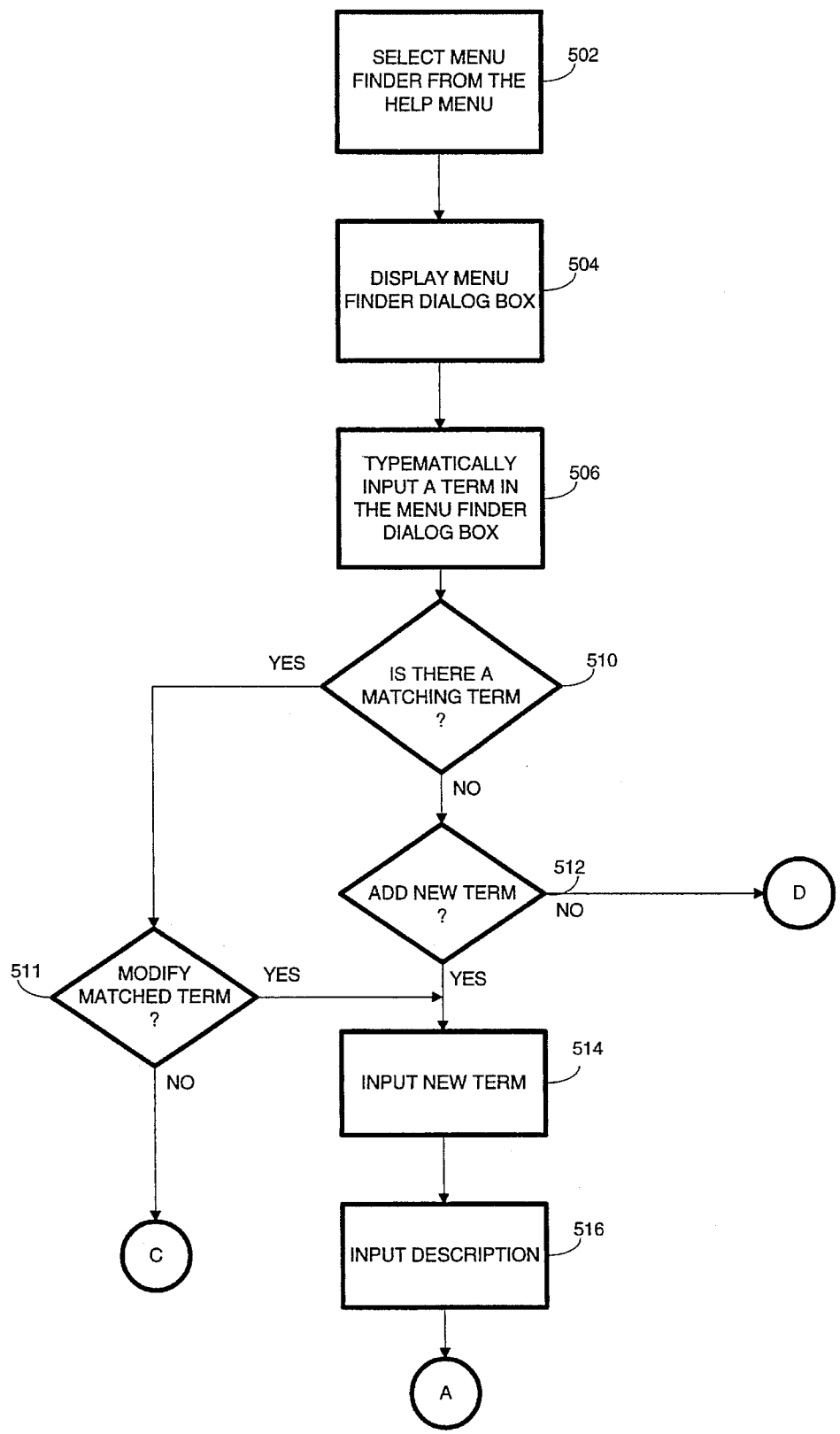
FIGS. 5A–5C illustrate a flow diagram showing the method of the preferred embodiment.
Figure 5B:
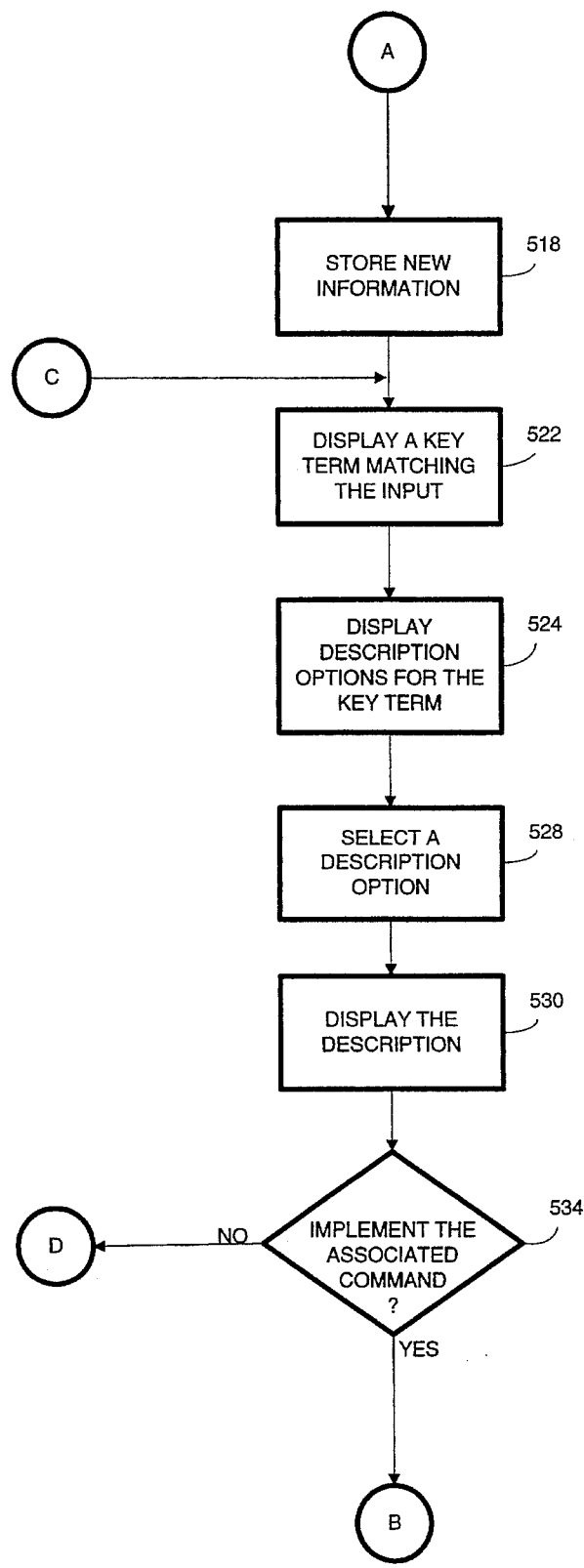
Figure 5C:
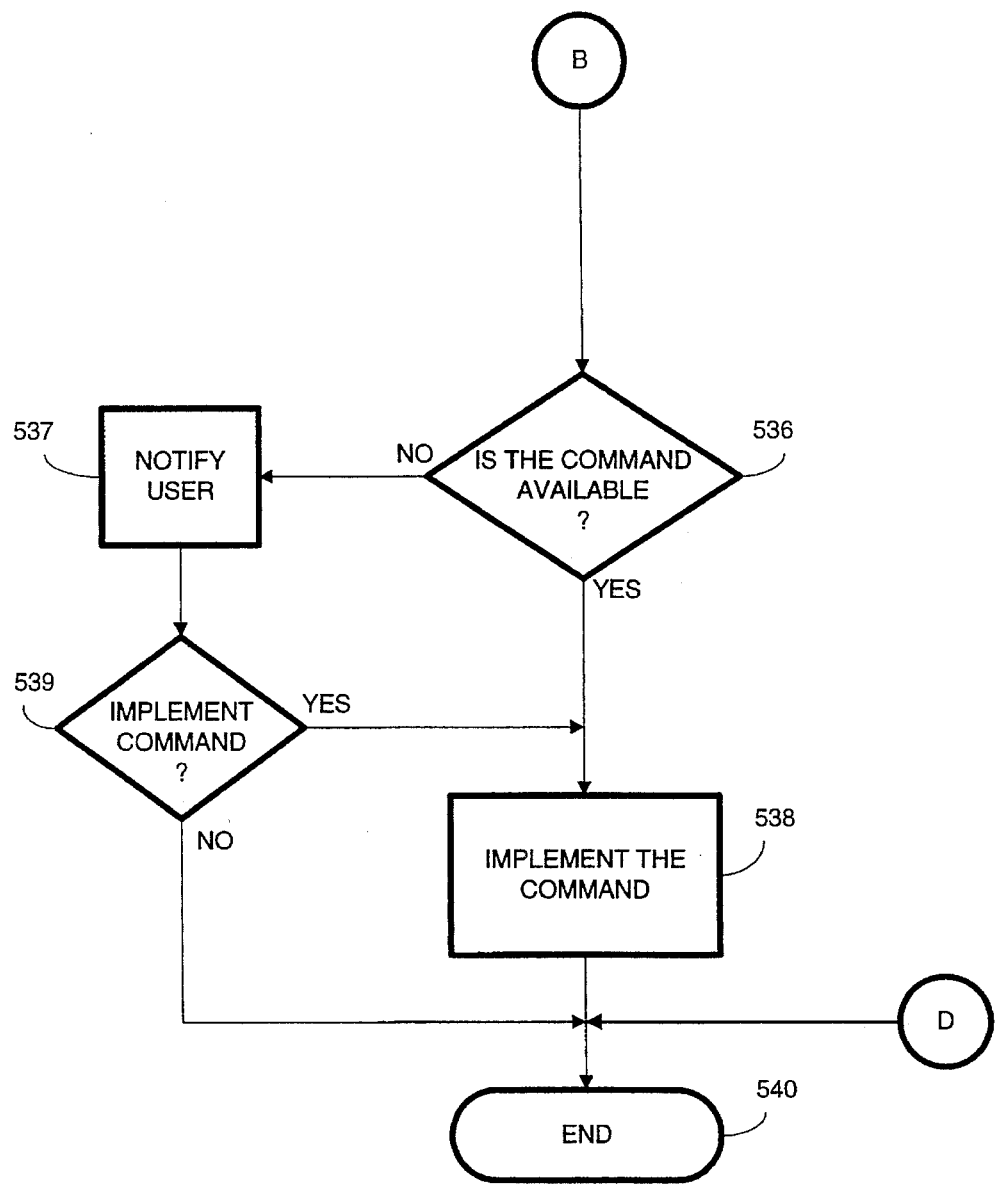

FIGS. 5A–5C illustrate a flow chart describing a technique for utilizing the Feature Finder. The user selects 502 the Feature Finder from the appropriate menu of the modified host program, e.g., the "Help" menu. The term recognizer 304 displays 504 a dialog box that requests that the user inputs a keyword describing a feature that the user wants to have performed. The user inputs 506 one or more letters of a keyword into the text entry list box until the typematic feature displays the desired keyword. The user then activates the list box, thereby displaying one or more choices alphabetically centered around a choice that most closely matches the combination of letters typed by the user. For example, if the Feature Finder module 202 is installed in conjunction with Microsoft Word and the user types "t" in the Feature Finder dialog box, the user is presented with a list of key terms from the database 302. In the center of the list is a key term beginning with the letter "t." If the user then types the letter "e", the user is presented with a list centered on a key term beginning with the first two letters "te." The user continues to enter letters until the desired key term is highlighted in the dialog box, i.e., the term recognizer 304 matches 510 the user term with a key term. If a match is found the user is given the option of modifying 513 the information associated with the matched key term. The technique for modifying the information associated with a key term is set forth below.

If no match is found the user is given the option 512 of customizing the Feature Finder program by adding a new key term or host program feature to the data base. The new key term can be any word or phrase that will help the user identify the associated feature. Examples of new key terms are foreign language terms, abbreviations, toolbar icon names, e.g., "scissors", and terms describing a feature that was added to the host program 120 by the user, e.g., "dictionary". If a key term is to be modified or added to the database 302 the user inputs 514 the new term into the term customizer 306. The user inputs information into the term customizer 306 in order to complete a profile of the new key term. The profile information includes the name of the associated feature, the menu bar, a textual description of the associated feature, short-cut keys, commands, and the menu location of the feature. The new information is stored in the database 302. In an alternate embodiment, the customized data is stored in a second database and the information contained in the original database 302 is not modified. This enables the user to restore the original database 302 at any time.

The customized database 302 can be distributed to other users. Therefore, the database 302 can be customized by an individual or a corporation and distributed to all end-users. Add-in vendors can create a customized version of database 302 and include that with their Add-in, thereby extending Feature Finder's capabilities to access the special features of the Add-in programs.

A key term can be modified by altering the key-strokes necessary to implement the feature associated with the key term. If multiple users utilize the same copy of the host program 120, one user may create an easy technique for implementing a particular feature, e.g., by creating a macro or by putting the feature on the toolbar. By altering the key-stroke portion of the database 302, a subsequent user of the host program 120 can learn of the easier technique by using the Feature Finder module 202.

If the term that is input by the user matches 510 a key term, the controller 308 displays 522 the key term to the user in the dialog box. The controller 308 also displays 524 a list of description options representing the categories of information stored in the database 302, described above. The user selects 528 the description option and the controller 308 displays 530 the description.

The user has the opportunity 534 to implement the feature associated with the matched key term. To implement the feature, the user selects the implementation option from the dialog box. The feature identifier 312 determines whether the feature is available based on the state or context of the host program 120. In some host programs certain features are only available when the host program 120 is in a particular state. For example, in Microsoft Word the "cut" feature is only available if one or more letters or an object are highlighted by the cursor. If the associated feature is available, the feature caller 314 instructs the CPU to implement the command 538. If the feature implementation requires additional information, the user will be prompted to provide such information. If the host program 120 is not in the state required to implement the feature the controller 308 displays a statement to this effect. The controller determines if it is possible to implement the command by changing the state of the program. If the feature can be implemented the user is given the option of implementing the feature. The feature caller 314 then modifies the state of the program and the CPU 108 implements 538 the feature.

The above described method "levels" the menu-hierarchy of the host program 120. Levelling the menu-hierarchy is the method by which all features of the host program 120 are directly accessible from a menu item, e.g., the Feature Finder menu item 706. The Feature Finder menu item 706 is described below with reference to FIG. 7. In contrast, features of the host program 120 are typically accessed indirectly by selecting one or more menus until the menu item containing the desired feature is available, as described above.

FIGS. 6–17 illustrate several examples of the technique described above with reference to FIGS. 5A–5C using the Access program (Commercially available from the Microsoft Corporation).

Figure 6:
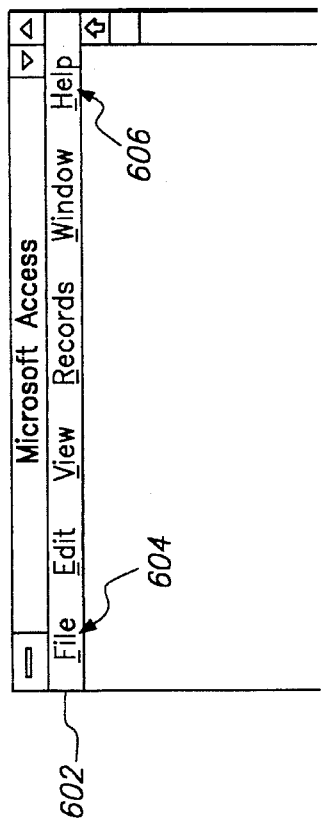
FIG. 6 is an illustration of a screen display showing a typical menu bar containing a Help menu.

FIG. 6 is an illustration of a screen display of Microsoft Access. The screen display 600 contains a menu bar 602. The host program 120, e.g., Microsoft Access, displays different menu bars 602 depending on the program context. The term "program context" refers to the feature area or mode the user is currently accessing. For example, Microsoft Access displays the menu bar 602 shown in FIG. 6 when in the "Form" context, i.e., when creating or modifying a form. A different menu bar is displayed when in the "Database" context. A menu bar 602 contains menus 604, 606, e.g., File, Edit, View, Records, Window and Help. Many host programs contain a Help menu 606. Typically, a help menu enables the user to view a description of the available features in the host program 120. A user selects the help menu if he wants to determine how to perform a feature in Microsoft Access.

Figure 7:
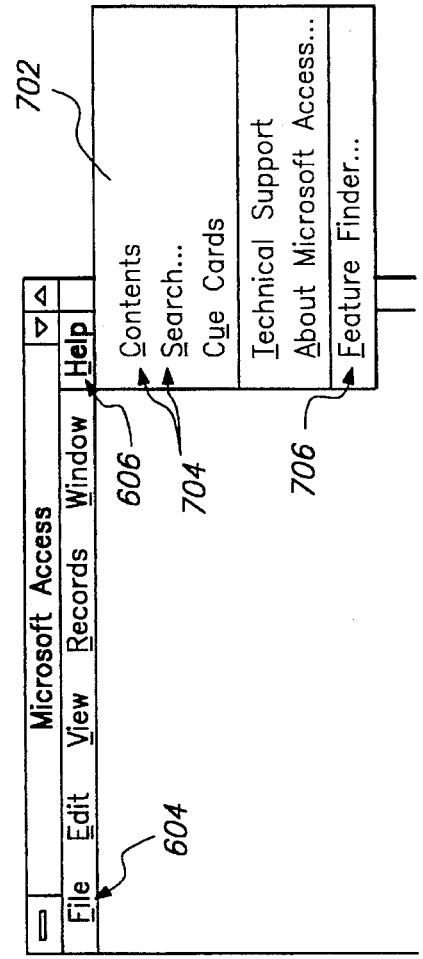
FIG. 7 is an illustration of a screen display after selecting a Help menu from a program that contains the Feature Finder capabilities.

FIG. 7 is an illustration of a screen display 700 after selecting the Help menu. A menu box 702 containing several menu items 704, 706 of the help menu 606 is illustrated. Alternatively, a menu 604, 606 may contain one or more sub-menus or a combination of sub-menus and menu items. The nesting of sub-menus creates the menu hierarchy, described above. The present invention modifies the menu by adding an additional menu item, i.e., Feature Finder 706, as described above. In alternate embodiments the Feature Finder menu, item 706 can be added to any preexisting menu or it can be part of a new menu that is added to the menu bar 602.

Figure 8:
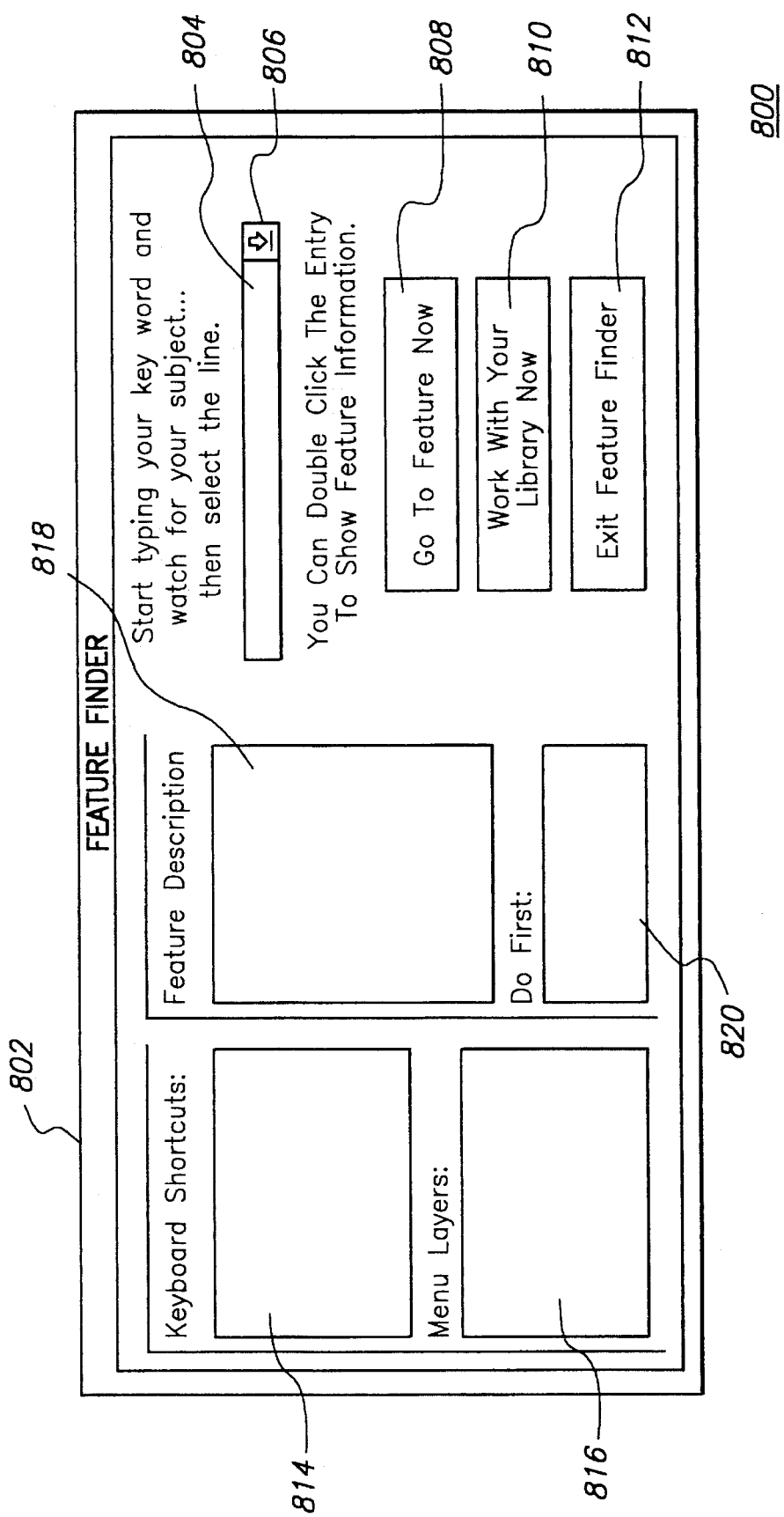
FIG. 8 is an illustration of a Feature Finder dialog box screen display after selecting the Feature Finder menu item.

FIG. 8 is an illustration of a Feature Finder screen display 800. After selecting 502 the Feature Finder menu item 706, the term recognizer 304 displays 504 a dialog box 802 as illustrated in FIG. 8. The dialog box 802 contains a key term list box 804, a key term list box expand option 806, an implement feature (Go To Feature Now) option 808, a key term editor (Work With Your Library Now) option 810, an exit Feature Finder option 812, a key term keyboard shortcut display 814, a key term menu layers display 816, a key term feature description display 818, and a prerequisite ("Do First") display 820. The options and displays 802–820 of the dialog box 802 are described below.

Figure 9:
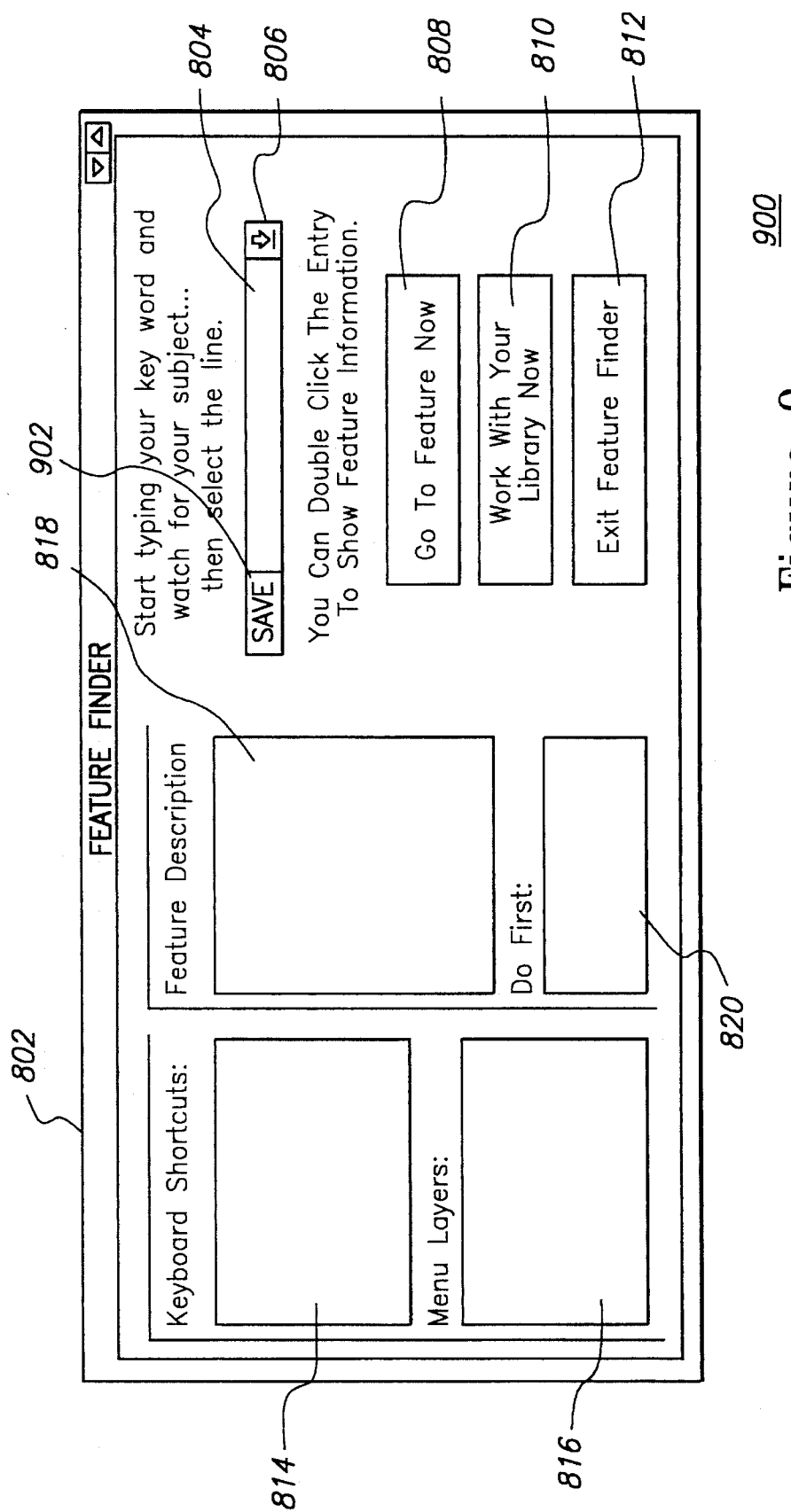
FIG. 9 is an illustration of a Feature Finder screen display after the user typematically inputs a first letter, displaying the first instance of that letter in the Feature Finder library of terms.

In order to determine how to perform a feature using the host program 120, e.g., Microsoft Access, the user enters a key term into the key term list box 804. As described above, the key term describes the feature. When selecting or editing a key term the user typematically inputs 506 a term into the key term list box 804. FIG. 9 is an illustration of a Feature Finder screen display 900 after the user typematically inputs 506 a first letter. After the user inputs the letter "s" the Feature Finder module 202 displays the key term "save" in the list box 804. "Save" is displayed because it is alphabetically the first key term in the database 302 that begins with the letter "s".

Figure 10:
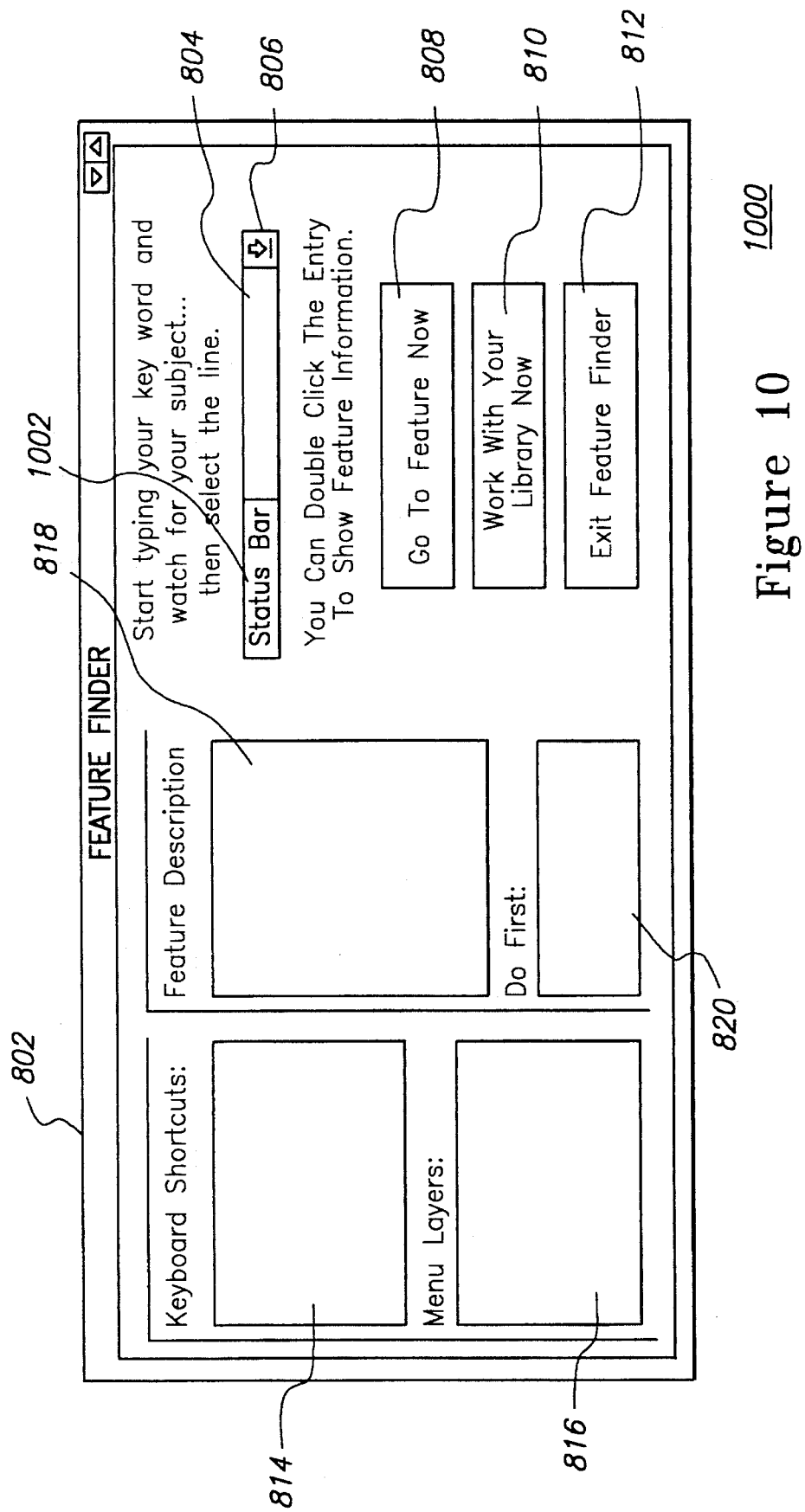
FIG. 10 is an illustration of a Feature Finder screen display after the user inputs a second letter, displaying the first instance of those two letters in the Feature Finder library of terms.

FIG. 10 is an illustration of a Feature Finder screen display 1000 after the user inputs a second letter. The user inputs in the letter "t" and the key term "Status Bar" is displayed in the key term list box 804. The key term "Status Bar" is displayed because it is alphabetically the first key term in the database 302 that begins with the letters "st". If the preferred key term is displayed in the key term list box 804 the user can double click the key term list box (using a mouse or other pointing device) and the information associated with the chosen key term is displayed in the dialog box display areas 814–820. If the preferred key term is not displayed in the key term list box 804, the user can input another letter or the user can display a list of key terms centered around the displayed key term using the key term list box expand option 806.

Figure 11:
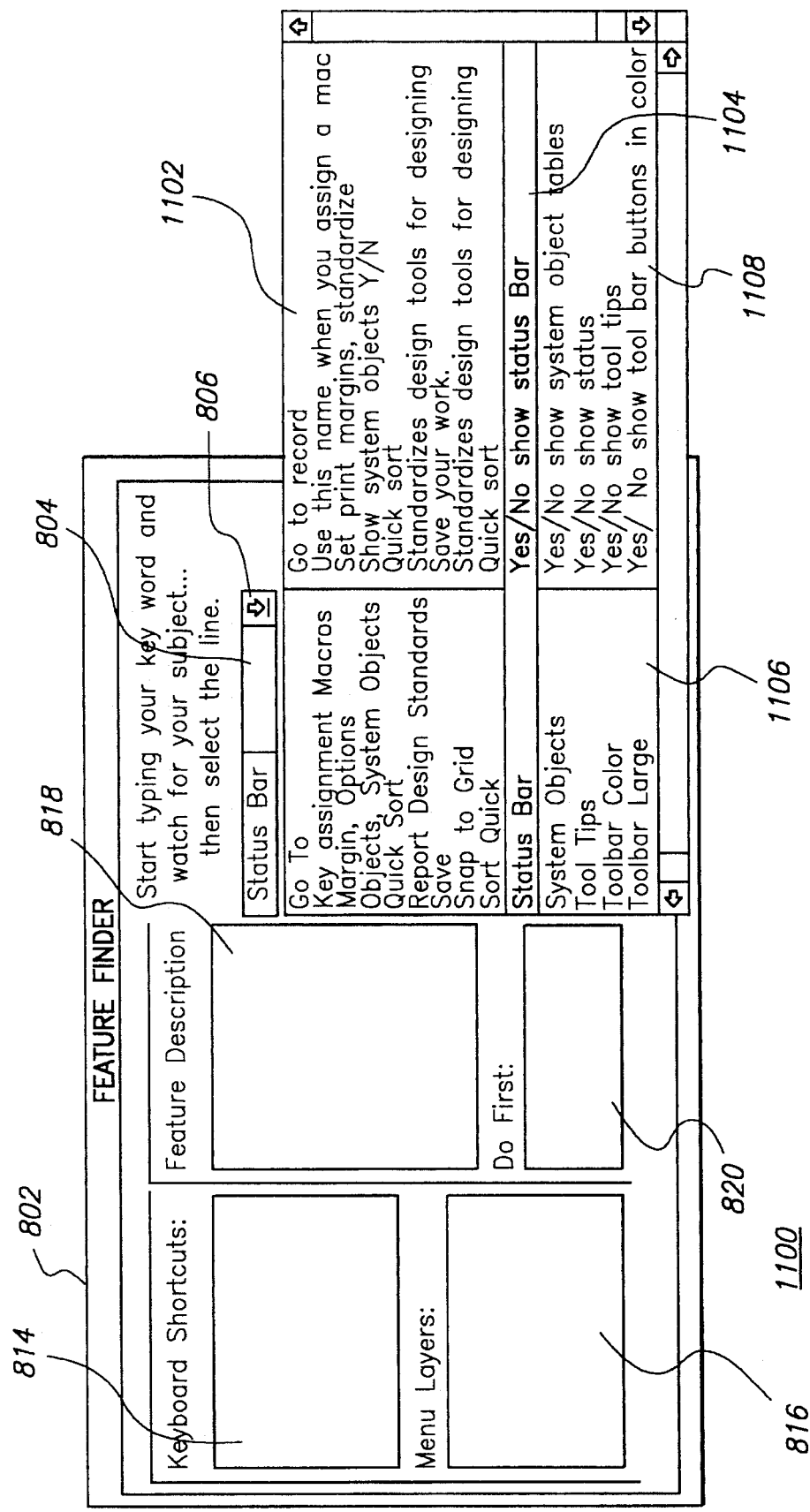
FIG. 11 is an illustration of a Feature Finder dialog box screen display after selecting a key term list box expand option.

FIG. 11 is an illustration of a Feature Finder screen display 1100. After selecting the key term list box expand option 806 an expanded key term list box 1102 is displayed. Many key terms are displayed alphabetically in the expanded key term list box 1102. The user can select the preferred key term by clicking the desired key term 1104. The expanded key term list box 1102 has two portions, namely; a key term list portion 1106, and a key term feature description portion 1108. The key terms are displayed in the key term list portion 1106. A brief description of the feature associated with the key term is displayed in the key term feature description portion 1108 to facilitate choosing a selection.

Figure 12:
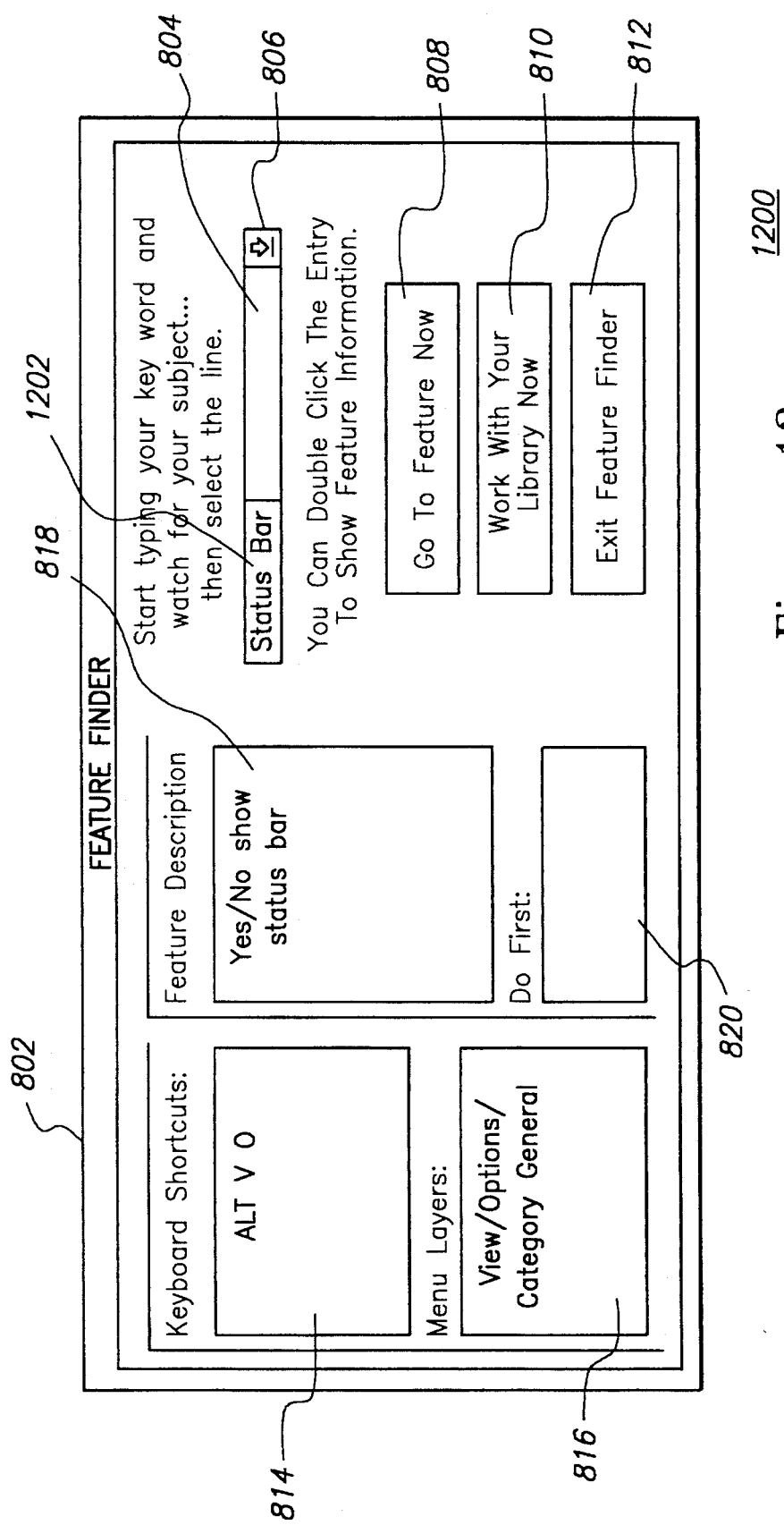
FIG. 12 is an illustration of a Feature Finder screen display after selecting a desired key term.

FIG. 12 is an illustration of a Feature Finder screen display 1200. After selecting the preferred key term 1202, e.g., "Status Bar", various information concerning the preferred key term 1202 is displayed in the dialog box 802. The key term keyboard shortcut display 814 displays a description of one or more keystroke combinations that will select and implement the feature associated with the key term. In the example illustrated in FIG. 12 the keyboard shortcut is "ALT V O". The key term menu layer display 814 displays how a user can manually locate the feature associated with the key term in the menu hierarchy. In this example, the "Status Bar" menu item is located several menus down the hierarchy. Specifically, the user would select the "View" menu, then the "Options" sub-menu and finally the "Category General" sub menu to manually access the status bar feature.

A description of the feature is displayed in the key term feature description display 818. It is possible that two identical key terms are present in the key term database 302. The future description display 818 provides a description of the feature to help the user decide which key term is associated with the desired feature. For example, the key term "Delete" may appear twice in the key term database 302. One occurrence may be associated with cutting or deleting text. The second occurrence may be associated with object deletion. The key term feature description display 818 provides one technique for differentiating between identical key terms. Differentiating between identical key terms is also achieved by using the key term feature description portion 1108 of the key term list box 1102, described above.

The user has the option of implementing the chosen feature by selecting the "Go to Feature Now" option 808. The user can exit the Feature Finder menu item 706 by selecting the "Exit Feature Finder" option 812. The user can edit the selected key term by selecting the "Work With Your Library Now" option 810. An example illustrating the technique for adding or editing a key term is described below with reference to FIGS. 16 and 17.

Figure 13:
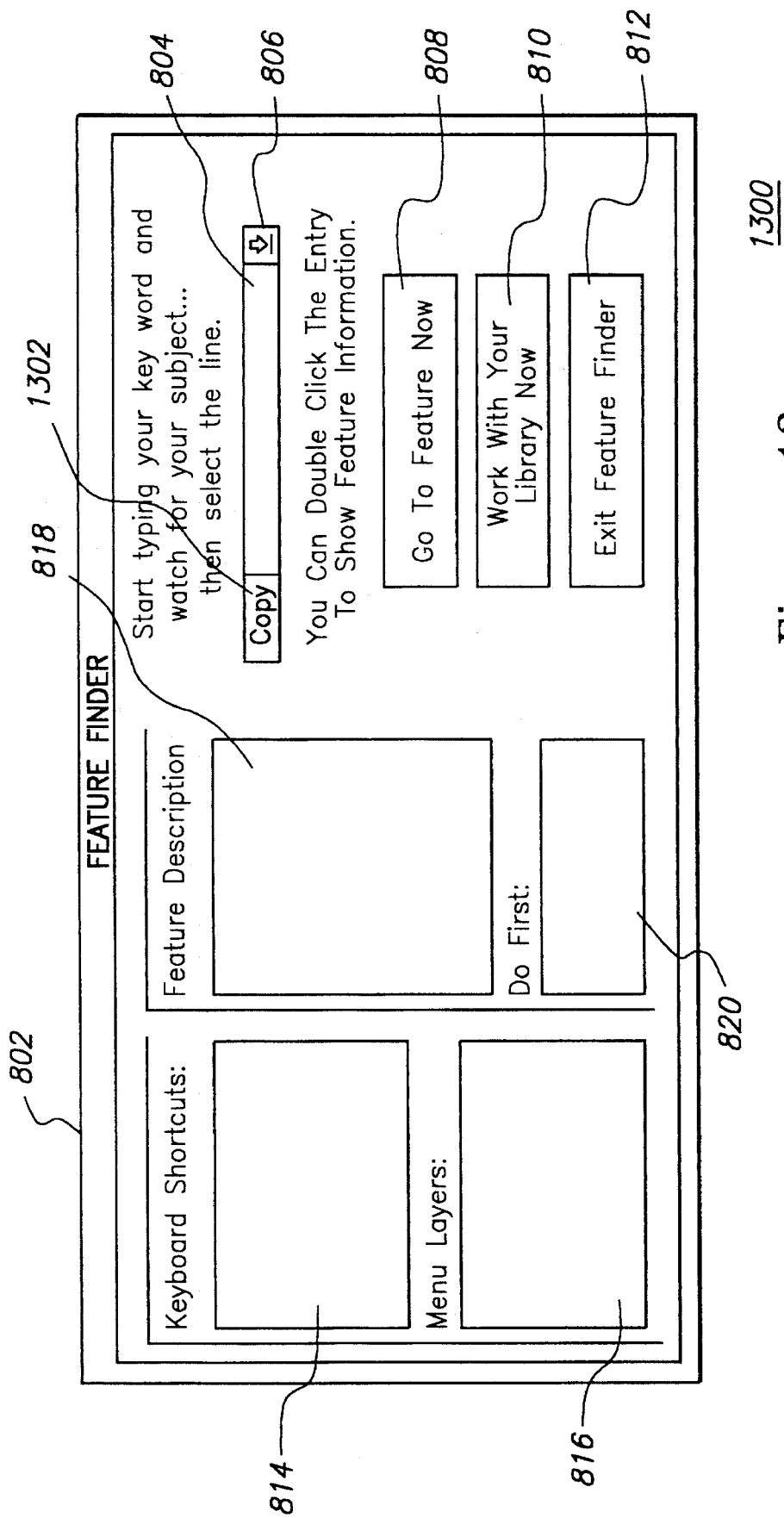
FIGS. 13 and 14 illustrate a second example of selecting a key term.
Figure 14:
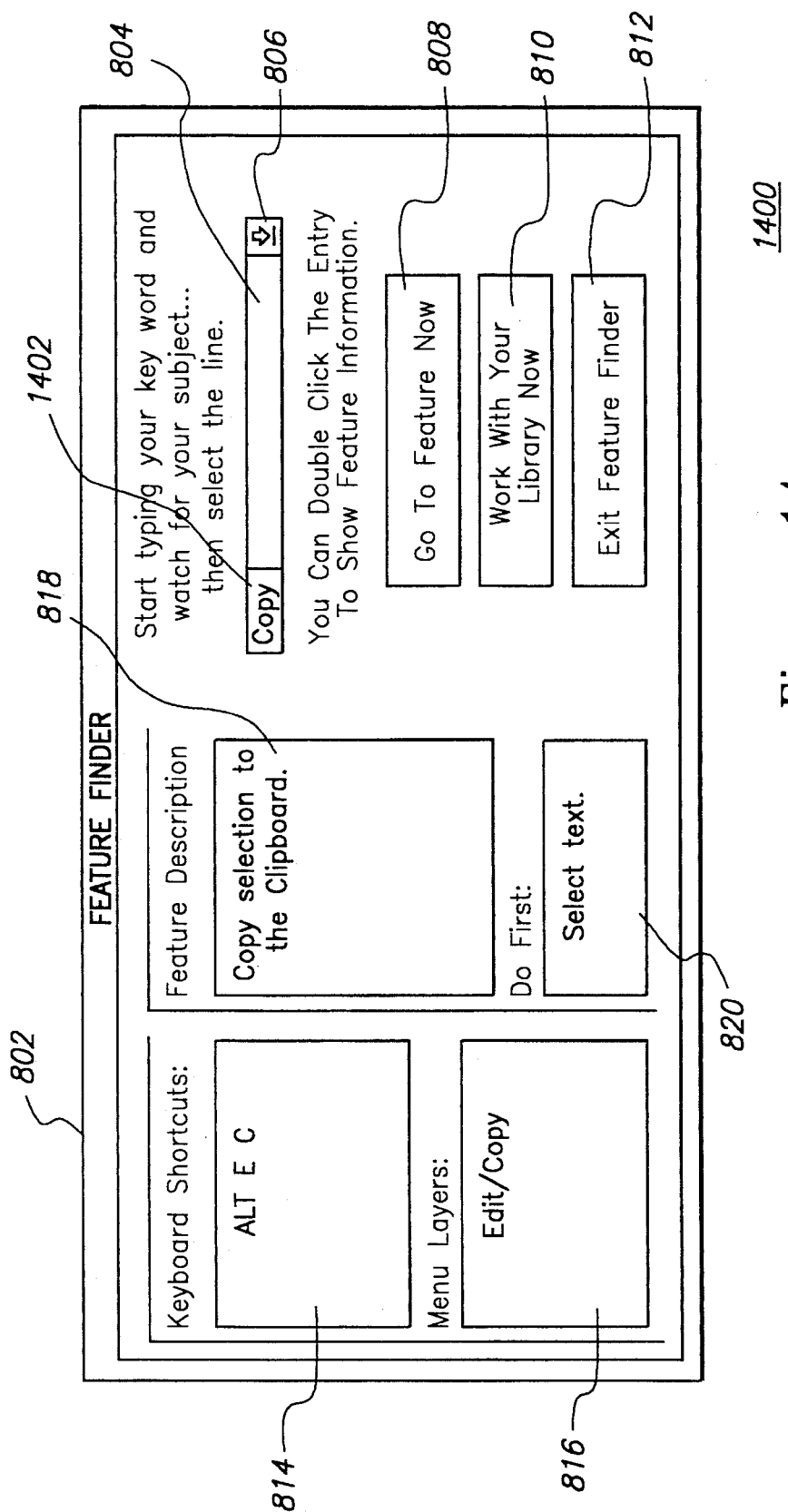

FIGS. 13 and 14 illustrate a second technique for selecting a key term. After the user inputs the letter "c", the key term "Copy" 1302 is displayed in the key term list box 804. The user can double click the key term list box 804 to display information associated with the "Copy" key term in the dialog box 802. As stated above, the user must select the text to be copied before performing a "copy" command. The Feature Finder module 202 alerts the user of this prerequisite in the "Do First" display 820. Also, the Controller 308 intercepts requests which either have not met the "Do First" condition or which are in the wrong context and displays an appropriate message box.

The Keyboard Shortcuts, Menu Layer, and Do First information is provided as an educational feature to help users to more efficiently use the host program 120.

Figure 15A:
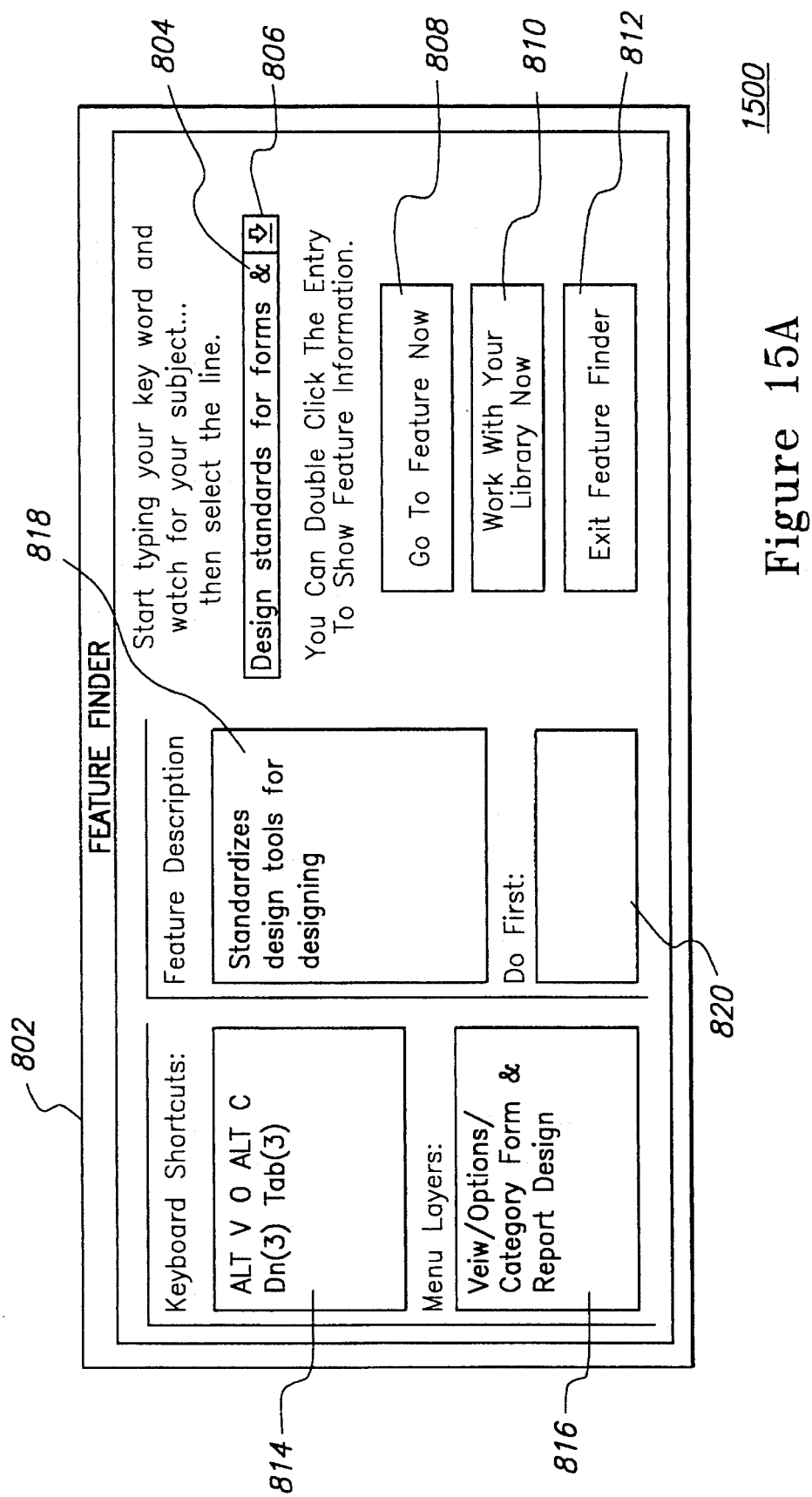
FIG. 15 illustrates a host program's dialog box for the requested feature.
Figure 15B:
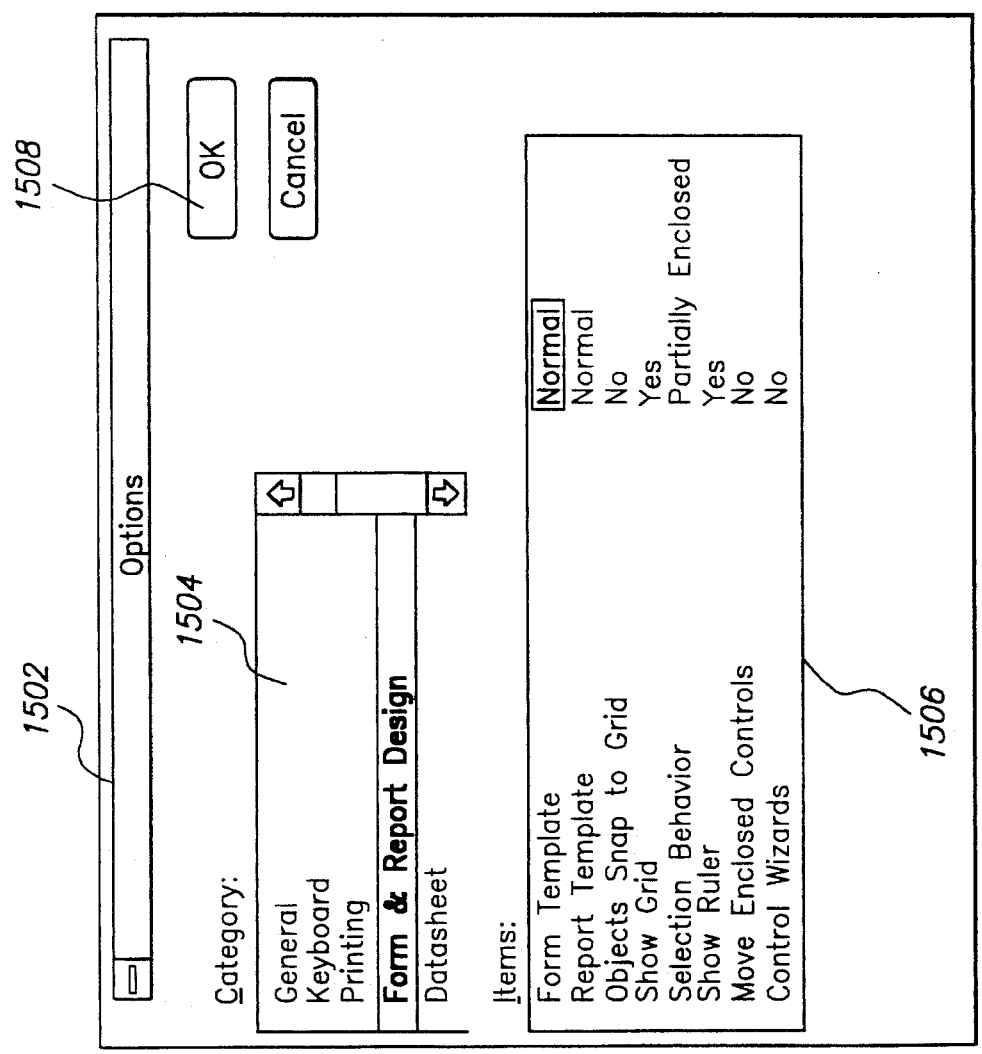

Occasionally, in order to fully implement a feature, additional information is required during feature implementation. FIG. 15 illustrates an example of such an occurrence. The user selects the key term "Design standards for forms & reports" using one of the techniques described above. The user implements the feature associated with the key term by selecting the "Go To Feature Now" option 808. The "Form & Report Design" feature is associated with the "Design standards for forms & reports" key term. The Feature Finder module 202 implements this feature. When implementing the "Form & Report Design" feature in Microsoft Access a dialog box having a category box 1504 and an items box 1506 is displayed. The user is given the opportunity to modify the status of the items in the items box 1506. The user selects the "OK" option 1508 when complete and the implementation of the "Form & Report Design" feature is continued.

Figure 16:
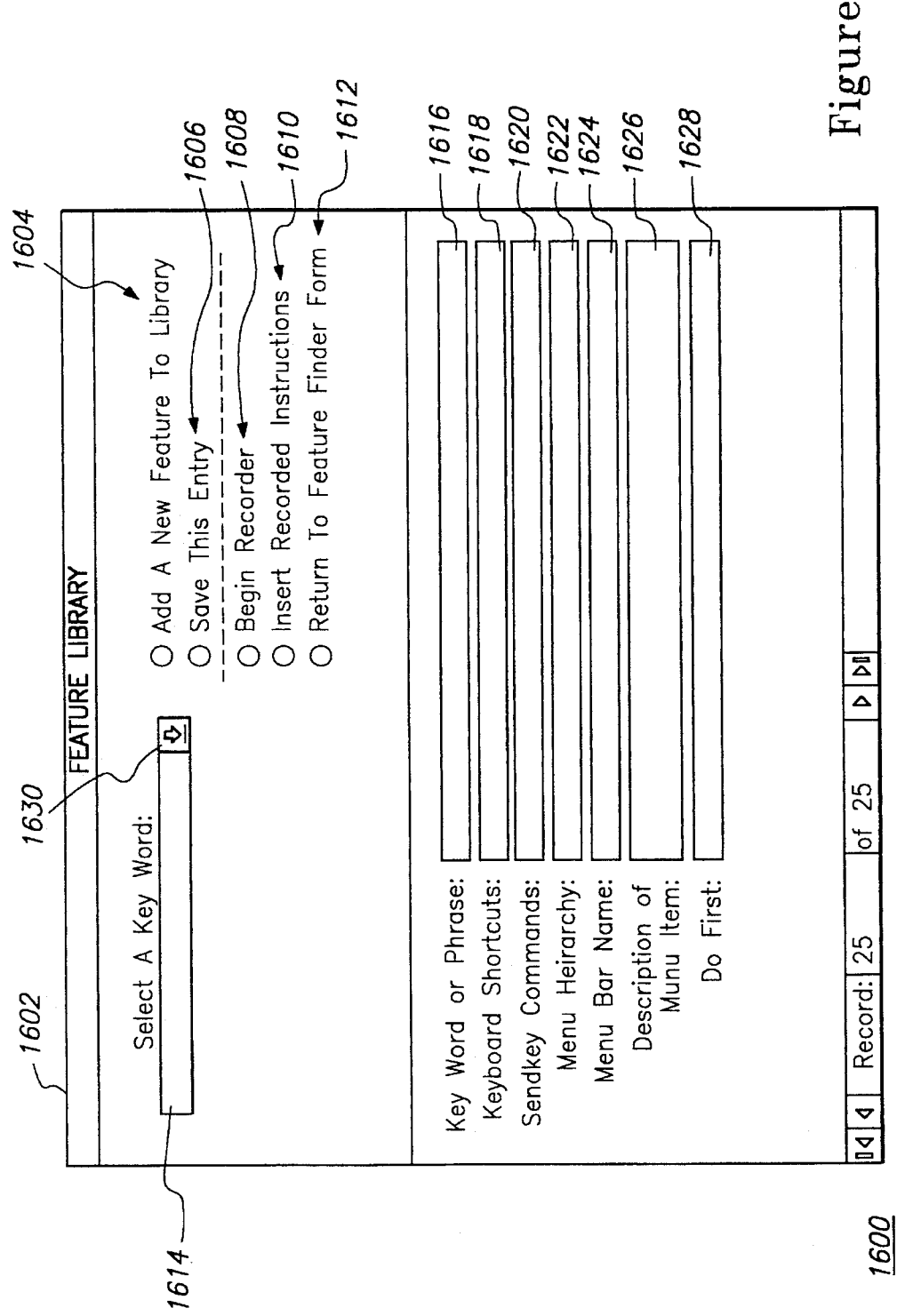
FIGS. 16 and 17 illustrate an example of adding a new key term or editing an existing key term, or adding a new host program feature to the Feature Finder library.
Figure 17:
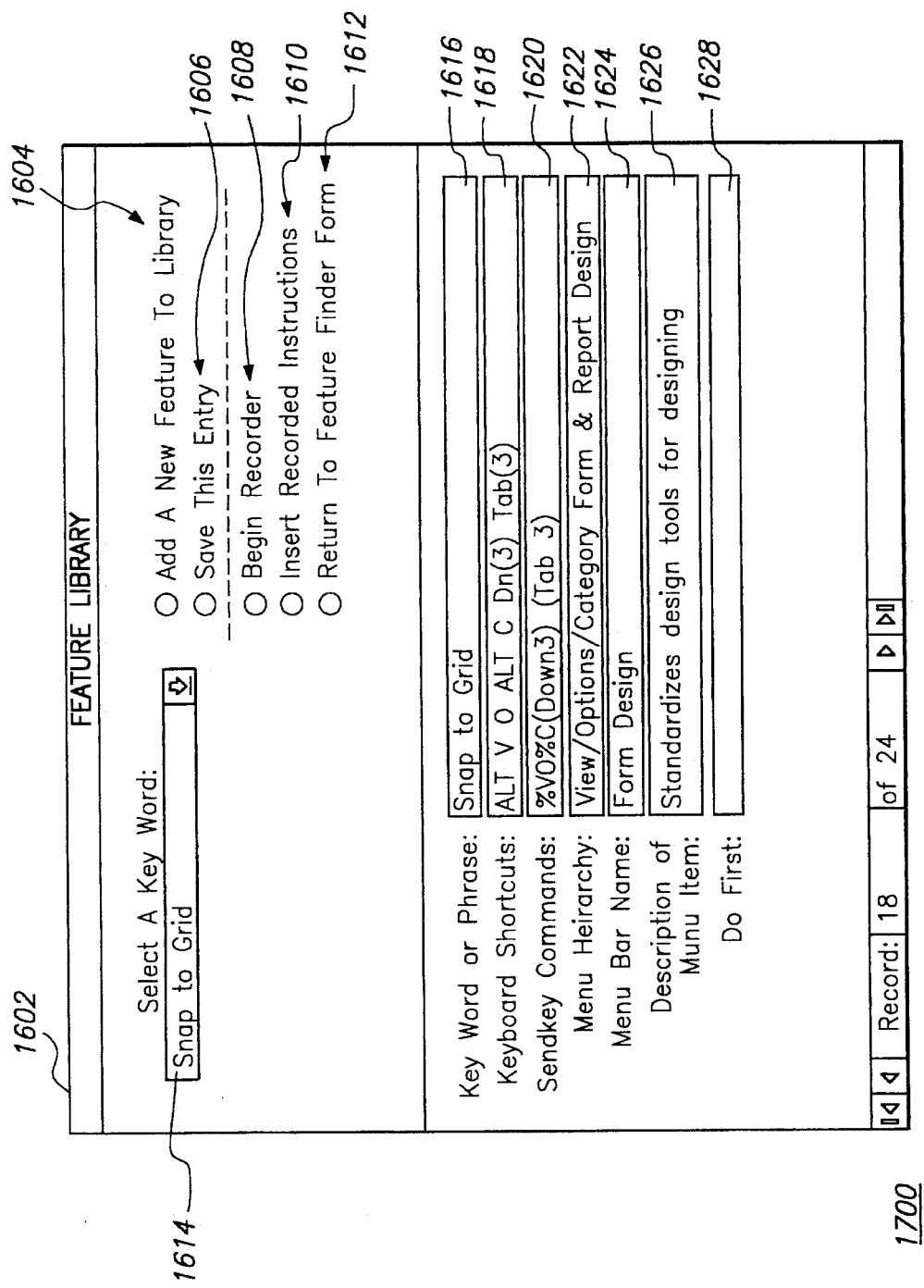

FIGS. 16 and 17 illustrate an example of adding a new key term to the database 302 or editing an existing key term. A user selects the "Work With Your Library Now" (editor) option 810 to add or modify a key term. After selecting the editor option 810 the editor dialog box 1602 is displayed. The user decides whether to add or edit a key term. To add a new key term to the database 302 the user selects the add key term option 1604. The user inputs the appropriate information into the information boxes 1616–1628, discussed below, and then selects the save key term option 1606. To edit an existing key term, the user typematically enters a key term. The key term is displayed in the key term list box 1614. To display information for an existing key term, the user can double click the key term list box 1614 or select the expand key term list box option 1630 to select the appropriate key term in accordance with the typematic key term selection technique described above. The "double click" selection technique is accomplished using a mouse or trackball, for example.

After selecting a key term, e.g., "Snap to Grid", information concerning the key term is displayed in the information boxes 1616–1628 of the editor dialog box 1602 as illustrated in FIG. 17. The user selects the information box whose information is to be modified. The key term information box 1616 contains the key term that is being added or modified. As described above, the key term identifies a feature of the host program 120. The keyboard shortcuts information box 1618 contains a description of the keyboard shortcut keystroke combinations, if any, that select the host program feature that is associated with the key term. The sendkey commands information box 1620 contains the programming code that invokes the feature. This programming information is used when implementing 538 the feature. The user can enter the sendkey command information manually or by using a "Record" feature. To use the record feature the user selects the "Begin Recorder" option 1608. The editor dialog box 1602 is replaced by the appropriate screen display of the host program 120, e.g., the main menu screen. The user then manually causes the feature to be executed by, e.g., selecting the appropriate menu item or implementing a keyboard shortcut. The user returns to the editor dialog box 1602 by selecting an "Recording Complete" option, not shown. The user can insert the recorded instruction into the sendkey commands information box 1620 by selecting the insert recorded instructions option 1610.

The menu hierarchy information box contains the hierarchy of menus that must be selected in order to manually implement the feature. The Menu Bar Name Information box 1624 contains the name of the menu bar from which the menu hierarchy is based. As described above, some host programs 120 have multiple menu bars. The information in the menu bar information box 1624 enables the Feature Finder to determine whether the application is in the proper state or context to implement the feature. The Feature Description Information box 1626 contains information describing the feature. The Do First information box 1628 contains a description of the prerequisites of the feature, as described above.

When editing a key term, the user can change the information contained in any of the information boxes 1616–1628. When adding a new key term, the user should enter all appropriate information into the information boxes 1616–1628.

The invention efficiently locates program features in a menu-oriented host program 120. The invention enables a user to locate a feature in a menu-based program by flattening the hierarchy without requiring prior knowledge of the terms used in the menu-oriented program. Additionally, the invention permits the user to customize the system by inputting user-defined terms and associating the terms with a particular feature.

What is claimed is:

1. A method for implementing a first feature of a computer program without invoking a menu hierarchy of the computer program that is associated with the first feature, the computer program and a defined library of terms stored in a memory module, the defined library of terms comprising pre-programmed terms and user defined terms, the method comprising the steps of:

(a) receiving a user input comprising one or more characters;

(b) automatically comparing said one or more user input characters with the defined library of terms to identify said user input with a first user defined term of the defined library of terms;

(c) determining the first feature that is associated with the first user defined term;

(d) providing information to the user after steps (a) and (b), said information describing the first feature to the user, said information being one of a description of the feature performed by the first feature, a description of a program context that is required by the computer program to implement the first feature, and a description of input commands necessary for the user to manually implement the first feature; and (e) implementing the first feature, after identifying said user input with the first user defined term, without utilizing the menu hierarchy associated with the first feature.

2. The method of claim 1, wherein said first user defined term is one or more user defined words that are associated with the first feature.

3. The method of claim 1, wherein said first user defined term is associated with a description of the first feature.

4. The method of claim 15, further comprising the step of modifying said defined library by associating a second user defined term with the first feature.

5. The method of claim 3, further comprising the steps of:

selecting a second user defined term associated with a second feature of the computer; and repeating steps (a) through (e) for said second feature.

6. The method of claim 1, wherein the step of implementing the first feature comprises one of:

directly implementing the first feature without displaying said menu hierarchy associated with the first feature; and displaying one or more menu selections of the menu hierarchy that are used to implement the first feature to assist the user in implementing the first feature.

7. The method of claim 9, wherein said description of information provided to the user describing the first feature is in the form of one of textual, graphical, and audible.

8. The method of claim 9, wherein the step of implementing the first feature further comprises the step of requesting additional information concerning the operation of the first feature.

9. The method of claim 1, wherein the step of implementing the first feature includes the step of directly implementing the first feature without utilizing said menu hierarchy associated with the first feature.

10. The method of claim 9, wherein said step of providing information to the user includes the step of displaying first feature prerequisite information that describes one of a prerequisite command and a prerequisite context for performing said first feature, when one of said prerequisite command and said prerequisite context are required by the computer program to perform the first feature.

11. The method of claim 9, wherein said direct implementation is accomplished using application programming interface calls.

12. The method of claim 1, further comprising the steps of:

selecting a pre-programmed term associated with a second feature of the computer; and repeating steps (a) through (e) for said second feature.

13. The method of claim 1, wherein said receiving step comprises the step of receiving a character that is input by a user.

14. The method of claim 13, wherein said automatically comparing step comprises the steps of:

typematically displaying a second term of said library of terms, said second term having one or more initial characters corresponding to said received characters; and repeating said receiving a character step and said typematically displaying step.

15. The method of claim 1, further comprising the step of storing a first user defined term in the defined library, comprising the steps of:
(i) receiving said user defined term;
(ii) associating said user defined term with said first feature, said first feature associated with a description of said first feature, said description including one of a prerequisite command and a prerequisite context for performing said first feature; and
(iii) storing the information received in steps (i)–(ii).

16. The method of claim 1, wherein steps (a)–(d) are performed after the user selects one of an icon, a menu item, and a typing key combination from the computer program.

17. A method for implementing a first feature of a computer program without invoking a menu hierarchy of the computer program that is associated with the first feature, the computer program and a defined library of terms stored in a memory module, the defined library of terms comprising pre-programmed terms and user defined terms, the method comprising the steps of:
(a) receiving a user input comprising one or more characters;
(b) automatically comparing said one or more user input characters with the defined library of terms to identify said user input with a first term of the defined library of terms;
(c) determining the first feature that is associated with the first term;
(d) providing information to the user after steps (a) and (b), said information describing the first feature to the user, said information being one of a description of the feature performed by the first feature, a description of a program context that is required by the computer program to implement the first feature, and a description of input commands necessary for the user to manually implement the first feature; and
(e) implementing the first feature, after identifying said user input with the first, without utilizing the menu hierarchy associated with the first feature.

18. The method of claim 17, wherein said first term is one or more words that are associated with the first feature.

19. The method of claim 18, wherein the step of implementing the first feature includes the step of directly implementing the first feature without displaying said menu hierarchy associated with the first feature.

20. The method of claim 19, wherein said step of providing information to the user includes the step of displaying first feature prerequisite information that describes one of a prerequisite command and a prerequisite context for performing said first feature, when one of said prerequisite command and said prerequisite context are required by the computer program to completely implement the first feature.

21. The method of claim 19, wherein said direct implementation is accomplished using application programming interface calls.

22. The method of claim 19, wherein said receiving step comprises the step of receiving a character that is input by a user.

23. The method of claim 22, wherein said automatically comparing step comprises the steps of:
typematically displaying a second term of said library of terms, said second term having one or more initial characters corresponding to said received characters; and repeating said receiving a character step and said typematically displaying step.

24. The method of claim 17, further comprising the step of storing a first user defined term in the defined library, comprising the steps of:
(i) receiving said user defined term;
(ii) associating said user defined term with said first feature, said first feature associated with a description of said first feature, said description including one of a prerequisite command and a prerequisite context for performing said first feature; and
(iii) storing the information received in steps (i)–(ii).

25. The method of claim 18, wherein said computer program is one of a computer application program and a computer operating system.

26. The method of claim 17, further comprising the step of storing said first term in the defined library, comprising the steps of:
(i) identifying said first term;
(ii) associating said first term with said first feature;
(iii) receiving a description of said first feature;
(iv) receiving first feature prerequisite information that describes one of a prerequisite command and a prerequisite context for performing said first feature, said prerequisite command, and said prerequisite context required by the host computer program; and
(v) storing said description and said first feature prerequisite information received in steps (i)–(iv).

27. A computer-based system having a defined library of terms stored in a memory module and a processor, for implementing a first feature of a computer program without invoking a menu hierarchy of the computer program that is associated with the first feature, the computer program and the defined library of terms stored in the memory module, the defined library of terms comprising pre-programmed terms and user defined terms, comprising:
an input means for receiving a user input comprising one or more characters;
a comparator, responsive to said input means, for automatically comparing said one or more user input characters with the defined library of terms to identify said user input with a first term of the defined library of terms;
a determinator, responsive to said comparator, for determining the first feature that is associated with the first term;
a information provider, responsive to said comparator and coupled to said storage means, for providing information to the user in response to said comparator, said information describing the first feature to the user, said information being one of a description of the features performed by the first feature, a description of a program context that is required by the computer program to implement the first feature, and a description of input commands necessary for the user to manually implement the first feature; and
a feature implementor, responsive to said determinator, for implementing the first feature without utilizing the menu hierarchy associated with the first feature.

* * * * *